United States Patent
Becker et al.

(10) Patent No.: US 7,270,516 B2
(45) Date of Patent: Sep. 18, 2007

(54) NON-ARTICULATED ROTOR AND ROTORCRAFT COMPRISING A ROTOR OF THIS TYPE

(75) Inventors: Gerold Becker, Maisach (DE); Rupert Pfaller, Riemerling (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 0 days.

(21) Appl. No.: 10/552,919

(22) PCT Filed: Apr. 6, 2004

(86) PCT No.: PCT/EP2004/003641

§ 371 (c)(1),
(2), (4) Date: Oct. 11, 2005

(87) PCT Pub. No.: WO2004/089746

PCT Pub. Date: Oct. 21, 2004

(65) Prior Publication Data

US 2006/0198732 A1    Sep. 7, 2006

(30) Foreign Application Priority Data

Apr. 8, 2003    (DE) ............................... 103 16 094

(51) Int. Cl.
*B64C 27/33* (2006.01)

(52) U.S. Cl. .................................. 416/134 A; 416/138
(58) Field of Classification Search ............ 416/134 A, 416/141, 138, 227 R, 212 R, 227 A, 240, 416/230, 229 R See application file for complete search history.

(56) References Cited

U.S. PATENT DOCUMENTS

| 3,384,185 | A |   | 5/1968  | Aerojet General Co |
|-----------|---|---|---------|--------------------|
| 4,299,538 | A |   | 11/1981 | Ferris et al. ............. 416/134 A |
| 4,344,739 | A | * | 8/1982  | Derschmidt et al. .... 416/134 A |
| 4,616,977 | A | * | 10/1986 | Schramm ................ 416/134 A |
| 5,820,344 | A |   | 10/1998 | Hamilton et al. ....... 416/134 A |

FOREIGN PATENT DOCUMENTS

| DE | 198 37 802 | 10/1999 |
|----|------------|---------|
| DE | 10019214   | 10/2001 |

* cited by examiner

*Primary Examiner*—Richard A. Edgar
(74) *Attorney, Agent, or Firm*—Darby & Darby

(57) ABSTRACT

A hingeless rotor, in particular for a rotorcraft, comprising: a rotor head, a rotor mast having a rotor axis, a torque-transmission element nonrotatably joined to the rotor mast, at least one rotor blade, and a rotor-head-side rotor-blade connector having a centrifugal-force-discharging blade connector loop, which loop encircles the rotor axis or the rotor mast and is nonrotatably joined to the torque-transmission element.

20 Claims, 2 Drawing Sheets

NON-ARTICULATED ROTOR AND ROTORCRAFT COMPRISING A ROTOR OF THIS TYPE

The present invention concerns a hingeless rotor as well as a rotorcraft having such a rotor.

BACKGROUND

Lift-generating rotor blades of a hingeless rotor for a rotorcraft are manufactured predominantly from fiber composite material. During continuous rotor operation, the rotor blades are deflected in various directions and heavily stressed as a result. The rotor blade usually possesses, at its end pointing toward a rotor head, a structural element having a flapwise-soft and lead-lag-soft region that allows motions of the rotor blade in a flapwise direction and a lead-lag direction. The structural element is also referred to as a flex beam. The flapwise-soft and/or lead-lag-soft region of the structural element is referred to overall as a flexurally soft region. In the direction of the longitudinal rotor-blade axis, the structural element is usually configured at its end pointing toward the rotor head with a blade connector that enables a connection to the rotor head or to a rotor-head plate.

The transition from the blade connector into the flexurally soft region is embodied to form a rotor-blade neck. The structural element on the one hand transfers drive torque from the rotor head to the rotor blade, and on the other hand transfers the centrifugal forces, acting on the rotor blade during rotor operation, to the rotor head. A disconnect point is often incorporated between the structural element and the rotor blade so that the structural element can be separately fabricated and more easily replaced in the event of damage. The lift-generating rotor blade region extends from this disconnect point to the outermost end of the rotor blade, i.e. to the rotor-blade tip.

The blade neck of the structural element generally possesses the flapwise-soft region, which constitutes a fictitious horizontally oriented axis (also called a fictitious or virtual flapping hinge) about which the rotor blade executes flapping motions. The distance between the fictitious flapping hinge and the rotor axis is referred to as the flapping hinge distance. In conventional hingeless rotors, the so-called fictitious or virtual flapping hinge distance is relatively large, constituting approx. 8 to 12% of the length of the rotor disc radius (measured from the rotor axis radially outward to the blade tip).

A large flapping hinge distance in a hingeless rotor results, during operation, on the one hand in good helicopter control response and maneuverability, but on the other hand, in particular, in a high natural flapping frequency. This relative high natural flapping frequency, and the vibrations that result therefrom in the case of a bearingless rotor, are disadvantageous in terms of the helicopter's flying characteristics, and lead to large stresses on the blade connector and blade neck. The blade connector and blade neck must therefore have correspondingly large dimensions in order to withstand the stress that occurs. In conventional helicopter rotors, a low natural flapping and lead-lag frequency is desirable for these reasons.

Because of the large stresses on the rotor blade and blade connector in a bearingless rotor, and the strength of those components that must be ensured in that context, it is extremely difficult to reduce the flapping hinge distance or decrease it below a specific value. In conventional bearingless rotors, a small flapping hinge distance would considerably reduce the durability and service life of the rotor blade in question, which is disadvantageous or even hazardous. On the other hand, however, a small flapping hinge distance would be desirable for a variety of applications, since helicopters having such a rotor are generally perceived by pilots, crew members, and passengers as being more comfortable.

A large flapping hinge distance can also be disadvantageous from an aerodynamic standpoint, since the total air resistance of the rotor elements extending from the rotor axis to the fictitious flapping hinge, in particular that of the aforesaid structural element, is quite high; and in addition, this region, which accounts for a relatively large proportion of the rotor radius, cannot be used for an aerodynamically effective region of the rotor blade.

DE 198 37 802 C1 discloses a hingeless rotor for a rotorcraft, encompassing a rotor head, a rotor mast having a rotor axis, a torque-transmission element nonrotatably joined to the rotor mast, at least one lift-generating rotor blade, and a rotor-head-side rotor-blade connector. In rotors of the aforesaid kind, the rotor-head-side rotor-blade connector usually encompasses, in addition to the structural element already described above, at least two bolts that are disposed substantially radially with respect to the rotation axis of the rotor and of the rotor blade. The flapping torque and lead-lag torque are transferred via these bolts. The structural element can be braced on the rotor-head plate by way of upper and lower support surfaces. The disadvantages explained previously exist with this design as well.

In conventional hingeless rotors for conventional helicopters, a low natural flap and lead-lag frequency is desirable, and is achieved by way of flapwise-soft and lead-lag-soft rotor-blade attachments. In special rotors, for example tilting rotors (also called tiltrotors) of tiltrotor helicopters or aircraft, however, a different design should be aimed at, for the following reasons: If the rotor is designed so that the natural lead-lag frequency of the rotor is less than the so-called excitation frequency, there is an elevated potential for the excitation of ground and air resonances. In conventional rotors, these resonance phenomena are controlled with dampers. The soft suspension of the tilting rotors on the wing of a tiltrotor helicopter, however, in contrast to a stiff cell of a conventional helicopter, causes undesired couplings between the natural wing frequency and the lead-lag frequency if the design falls below the excitation frequency. For these reasons, a more lead-lag-stiff rotor is necessary for tilting rotors. Conventional hingeless rotors are therefore not suitable for tiltrotor applications, and would result in strength and safety problems.

SUMMARY OF THE INVENTION

An object and technical problem on which the invention is based is that of creating a novel hingeless rotor that possesses improved aerodynamic and mechanical properties, as well as the smallest possible fictitious or virtual flapping hinge distance. The rotor is intended also to be suitable, in at least one embodiment, as a tilting rotor. A rotorcraft having such a rotor is also to be made available.

the present invention provides a hingeless rotor, in particular for a rotorcraft, that encompasses a rotor head, a rotor mast having a rotor axis, a torque-transmission element (e.g. a rotor-head star, rotor-head plate, or the like) nonrotatably joined to the rotor mast, at least one rotor blade (but preferably more than two rotor blades), and a rotor-head-side rotor-blade connector having a centrifugal-force-discharging blade connector loop, which loop encircles rotor axis A or the rotor mast and is nonrotatably joined to the torque-transmission element.

In the solution according to the present invention, the blade connector is therefore guided around the rotor axis or rotor mast. Encirclement of only the rotor axis can exist, for example, if the rotor mast itself ends below the blade connector loops in the axial direction and does not pass directly through the loops, which may be the case for certain rotor mast attachments. Preferably, no direct connection and no direct contact exists between the blade connector loop and the rotor mast. In other words, the blade connector loop encircles the rotor mast preferably in unattached fashion, as will be described below in detail. In order to discharge the stresses of the rotor blade centrifugal forces, the blade connector loop is joined either to the torque-transmission element (or to a component thereof) and/or directly or indirectly (e.g. via an intermediate element) to the blade connector loop of at least one further rotor blade. At its side facing toward the rotor-blade tip, the blade connector loop advantageously transitions into an loop base region or a rotor-blade neck, or possesses a disconnect point for releasable attachment to a rotor-blade neck.

The hingeless rotor according to the present invention possesses improved aerodynamic and mechanical properties as well as a very small fictitious or virtual flapping hinge distance. By means of the blade connector loop of the rotor according to the present invention, identical rotor-blade connectors can be made available even for a multi-blade rotor. By way of the blade connector loop, a respective rotor blade can be mounted on the rotor head in very flexurally soft fashion and with a greater connection softness, and with a small fictitious flapping hinge distance, i.e. one considerably decreased as compared with conventional hingeless rotors.

Because the blade connector loop as a rule possesses no direct attachment to the rotor mast, i.e. is free to move with respect to the rotor mast, and can be embodied in physically very flat and aerodynamically favorable fashion, the loop can elastically deflect in the flapwise direction as far as the rotor axis (or even beyond the rotor axis) almost without hindrance. The fictitious flapping hinge distance resulting therefrom can therefore be as little as 0%. Without discrete components and simply by way of the elasticity or bendability of the blade connector loop and/or the adjacent rotor-blade regions, it is thereby possible to implement, for example, a so-called gimbal rotor. A rotor having a small flapping hinge distance is perceived by passengers of a rotorcraft to be pleasant in terms of its flying characteristics. The embodiment according to the present invention moreover allows a reduction in the vibrations occurring at the rotor, and an improvement in flying characteristics and flying properties.

The blade connector loop or its blade foot region can moreover constitute a fictitious flapping hinge, and furthermore can be configured if necessary in highly torsionally soft fashion, so that bearingless blade angle adjustment can easily be implemented. The blade connector loop, or subregions thereof, can thus additionally assume the function of a very short and compact torsion element for blade angle adjustment. At least subregions of the blade connector loop and/or adjacent rotor-blade regions can be enclosed by a so-called control bag.

In addition, the partial length of the available rotor disc radius necessary for creation of the virtual flapping hinge is very small as compared with conventional hingeless or bearingless rotors. The parts of the rotor disc radius thus saved are therefore available for aerodynamically effective profiled regions of a rotor blade. Air resistance is thus reduced, and lift increased. In combination with the construction of the rotor-blade connector loop, which can per se be made very thin and flat, the aerodynamic quality of the rotor is therefore improved. The rotor according to the present invention can in principle be configured with both a high and a low lead-lag stiffness, the flapwise stiffness and lead-lag stiffness being presettable in design terms practically independently of one another. The wide loop shape of the blade connector and the loop foot region, as well as further structural features possible in this connection that are explained in detail below, nevertheless make possible, in particular, easy embodiment of a lead-lag-stiff attachment of the rotor blades to the rotor head.

In combination with the small flapping hinge distance (as low as 0%) that is achievable, this is very advantageous for specific applications, for example in a tilting rotor for a tiltrotor helicopter or tiltrotor aircraft. The reason is that the lead-lag deformations, resulting from Coriolis forces, which otherwise occur upon tilting of the tilting rotor in combination with a flapwise motion, can hereby be eliminated. A design that is advantageously adapted to the stresses that occur, and high rotor strength simultaneously with low weight, are therefore achievable. With a rotor having a lead-lag-stiff design as well as a large flapping hinge distance and consequently an undiminished Coriolis force, on the other hand, it may in some circumstances become impossible to guarantee sufficient stability for the tilting rotor.

It is furthermore possible, with the aid of the loop principle according to the present invention, to keep the rotor mast, as well as any applicable further add-on elements of the blade connector loop, free of centrifugal force, i.e. unstressed by the very large centrifugal forces acting on the rotor blades during continuous rotor operation. This is described below in further detail. This advantageous effect is very easy to achieve, particularly with multi-blade rotors. Depending on the configuration of the rotor, the centrifugal forces of respectively oppositely located rotor blades can in fact be mutually canceled out. The centrifugal force is transferred in this context, very favorably, over the relative large loop diameter, which corresponds at least to the diameter of the rotor mast but as a rule should be larger.

Further preferred and advantageous embodiment features of the rotor according to the present invention are the subject matter of the claims.

According to a second aspect, the aforesaid object is achieved by a rotorcraft, in particular a tiltrotor helicopter, having at least on hingeless rotor according to the present invention. Substantially the same advantages that have already been explained above in connection with the rotor according to the present invention can be achieved with the rotorcraft according to the present invention.

Preferred exemplifying embodiments of the invention, with additional configuration details and further advantages, are described in more detail and explained below with reference to the appended drawings.

DETAILED DESCRIPTION

Figure 1:
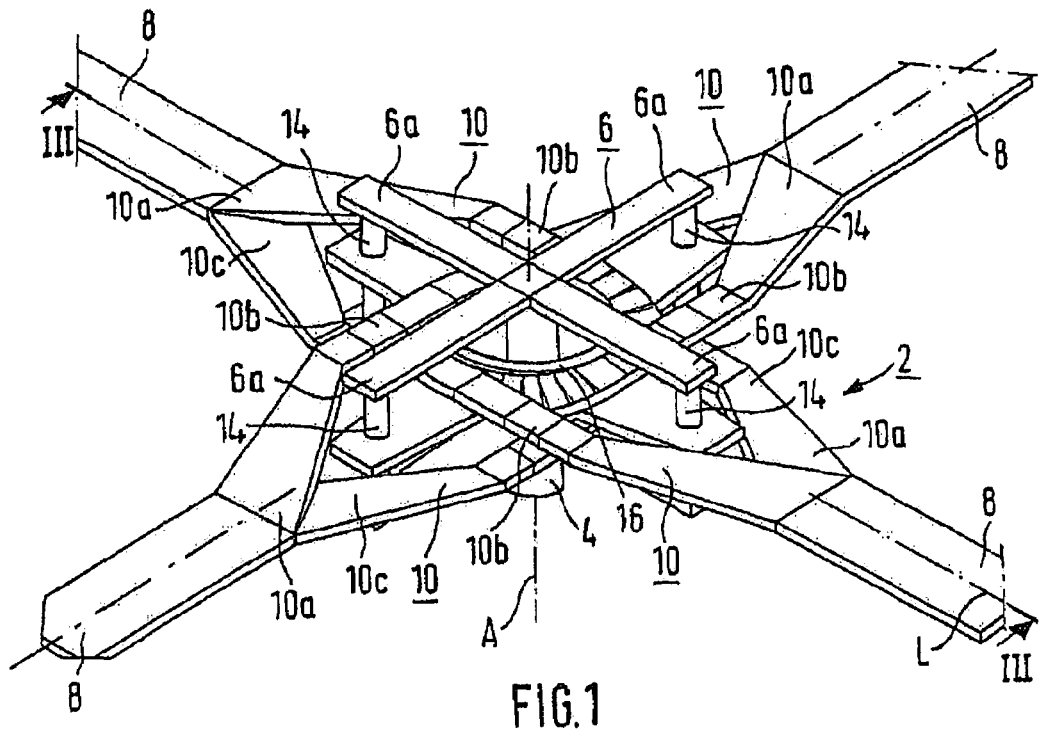
FIG. 1 is a schematic, greatly simplified perspective depiction of a rotor according to the present invention in accordance with a first embodiment.

In the description that follows and in the Figures, in order to avoid repetition, identical constituents and components will also be labeled with identical reference characters if no further differentiation is necessary.

Figure 2:
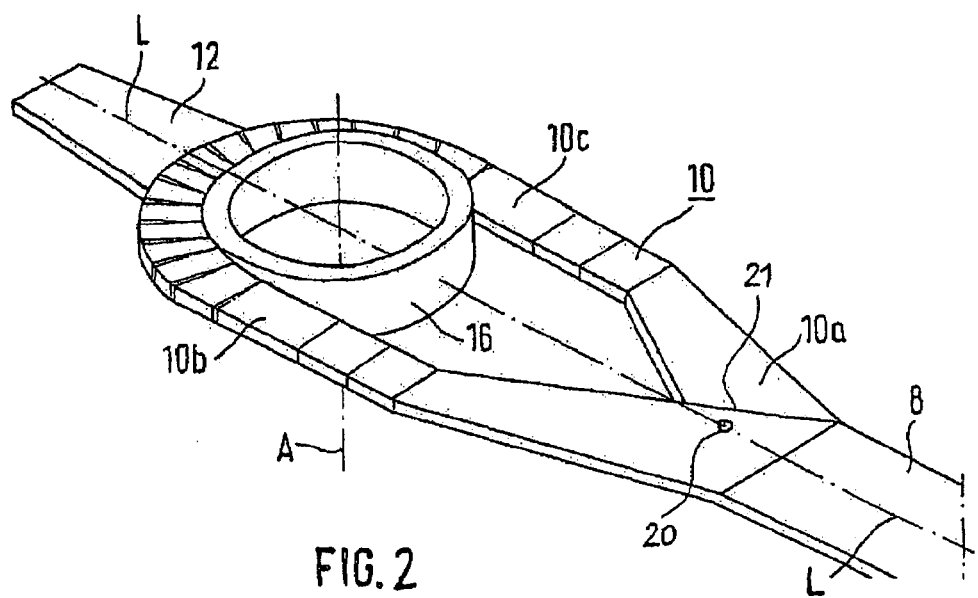
FIG. 2 is a schematic, greatly simplified perspective depiction of a single rotor-blade connector of the rotor of FIG. 1.

FIG. 1 is a schematic, greatly simplified perspective depiction of a hingeless rotor according to the present invention, in accordance with a first embodiment. FIG. 2 is a schematic, greatly simplified perspective depiction of an individual rotor-blade attachment of the rotor of FIG. 1. The hingeless rotor according to the present invention, which is here configured simultaneously as a bearingless rotor, encompasses a rotor head 2, a rotor mast 4 having a rotor axis A, and a torque-transmission element 6 nonrotatably joined to rotor mast 4, that element being configured in this example as a cross-shaped rotor-head star 6 having four arms 6a. The rotor is further equipped with four similar rotor blades 8, each of which has a respective arm 6a associated with it.

For each rotor blade 8, the rotor encompasses a rotor-head-side rotor-blade connector having a centrifugal-force-discharging blade connector loop 10 which encircles rotor mast 4 in unattached fashion and is nonrotatably joined to rotor-head star 6. Blade connector loop 10 is fabricated substantially from fiber composite material, and forms a structural element having a flapwise-soft, lead-lag-soft, and torsionally soft region. As is evident from FIGS. 1 and 2, blade connector loop 10 extends in longitudinal direction L of the associated rotor blade 8, and in this exemplifying embodiment is an integral component of rotor blade 8. In principle, however, blade connector loop 10 can also be configured as a component separate from rotor blade 8 and can be joined detachably to rotor blade 8, for example, via a disconnect point. As is evident from the drawings, blade connector loop 10 is elongated in configuration. The loop opening lies in a direction substantially parallel to rotor axis A. In this case, blade connector loop 10 is self-contained, and transitions at its side facing toward a rotor-blade tip (not shown) into a blade foot region 10a that is adjacent to a rotor-blade neck. At this blade-foot region 10a, the two loop arms 10b, 10c of the loop segment gradually merge.

In principle, however, blade connector loop 10 can also be of open configuration, and can possess at least one loop closure element 20 (see FIG. 2) to close the open blade connector loop 10. It is conceivable, for example, for the respective blade connector loop 10 to be slotted in its loop foot region 10a, (see slot 21 in FIG. 2) so that in the context of a multi-blade rotor, loops 10 can be installed in the configuration shown in FIG. 1 by insertion into one another. The open blade connector profile 10 could then be closed again using suitable joining means, e.g. threaded connections 20. A two-part or multi-part loop construction is also conceivable.

The respective blade connector loop 10 and its loop foot region 10a possess a flattened, strip-shaped cross section. As a result, blade connector loop 10 is flexurally soft or flapwise-soft in the flapwise direction of rotor blades 8, and flexurally stiff or lead-lag-stiff in the lead-lag direction. This simultaneously yields a relatively high torsional softness in the blade connector region, which is advantageous for bearingless blade angle adjustment.

As shown particularly clearly in FIG. 2, blade connector loop 10 possesses a joining portion 12, radially spaced away from axis A of rotor mast 4, that is configured here as a thin or flat, lead-lag-stiff joining tab 12 and is disposed in longitudinal direction L of rotor blade 8 on the side of blade connector loop 10 facing away from the rotor-blade tip. At this joining tab 12, blade connector loop 10 is nonrotatably joined to rotor-head star 6 or to its arms 6a via a bolt 14, or another suitable joining element, that extends through an orifice or opening in joining tab 12 (see FIG. 1). The orifice or opening can be embodied to a slight extent as an elongated hole in the radial direction of the rotor.

The length of joining tab 12 and thus the radial spacing from rotor axis A, as well as the thickness of joining tab 12, influence the fictitious flapping hinge distance and the flapwise stiffness; the length and width influence the lead-lag stiffness. The lead-lag stiffness is additionally influenced by the spacing between loop arms 10b, 10c and by the width of loop foot region 10a.

As illustrated in FIG. 1, blade connector loops 10 of rotor blades 8 are embodied in intersuspended or interleaved fashion, or are suspended in one another when the rotor is assembled. This interleaving can be accomplished either when they are manufactured (for self-contained blade connector loops 10) or when they are assembled (for loops that are to be opened).

FIGS. 1 and 2 reveal a further important configuration detail of the rotor according to the present invention. As illustrated in these Figures, rotor mast 4 extends, in the region of rotor head 2, in unattached or non-contact fashion through a ring-like centrifugal-force sleeve 16. The respective blade connector loop 10 is also placed around centrifugal-force sleeve 16 in such a way that the inner periphery of the loop portion extending around rotor mast 4 and around centrifugal-force sleeve 16 rests over a large area against the outer periphery of centrifugal-force sleeve 16. In the context of the four-blade rotor of the present exemplifying embodiment, blade connector loops 10 therefore encircle centrifugal-force sleeve 16 at an offset angle of 90 degrees from one another.

As stated, no direct attachment exists between centrifugal-force sleeve 16 and rotor mast 4, this being achieved here in that the inside diameter of centrifugal-force sleeve 16 is larger than the outside diameter of rotor mast 4, and a space exists between centrifugal-force sleeve 16 and rotor mast 4. Centrifugal-force sleeve 16 is thus free to move with respect to rotor mast 4. It could also be said that centrifugal-force sleeve 16 is located in floating fashion. It is made, for example, of a metallic material, but can also be produced from a fiber composite material or other suitable materials.

To ensure that centrifugal-force sleeve 16 does not axially slip or fall out, there can be disposed between centrifugal-force sleeve 16 and rotor mast 4, for example, an elastic intermediate element (an elastomer element or the like). This is not depicted in FIG. 1 for the sake of clarity. The elastic intermediate element can also perform damping functions and at the same time promotes the connection softness of rotor blades 8, without thereby interfering with the flexural deformation of blade connector loops 10 that is necessary, in particular, for the flapping motion of rotor blades 8. For axial retention of centrifugal-force sleeve 16, the latter can also comprise, for example, one or more collars, flanges, projections, or other retention elements that are braced, for example, against rotor-head star 6 and/or blade connector loops 10.

Figure 3:
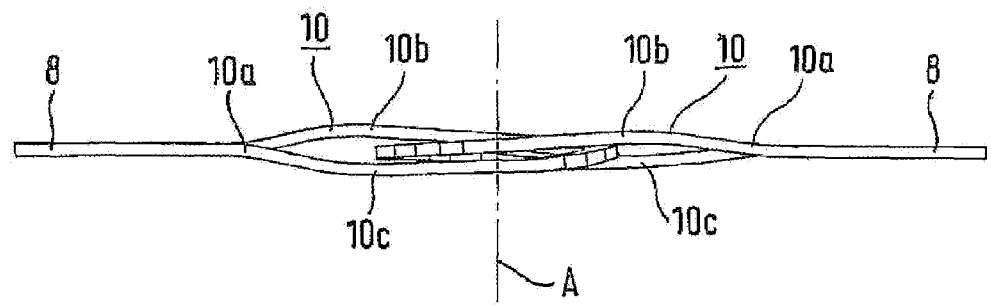
FIG. 3 is a schematic side view of the rotor of FIG. 1, viewed in the direction of arrows III-III in FIG. 1.

FIG. 3 is a schematic side view of the rotor of FIG. 1, looking in the direction of arrows III-III in FIG. 1. For reasons of better clarity, only two rotor blades 8 are depicted in FIG. 3, and rotor-head star 6 and rotor mast 4 have been omitted. As is evident from the Figure, each blade connector loop 8 possesses two loop portions (e.g. loop arms 10b, 10c) that extend largely in different planes relative to one another with reference to the axial direction or axis A of rotor mast 4, and are combined into an loop. This is important for the interleaving of the individual rotor-blade loops 10, and at the same time ensures that all the rotor blades 8 lie in a common plane.

In principle, however, it is also conceivable for purposes of the invention for loop portions 6a of blade connector loop 10 themselves to lie in a common plane. In a rotor having multiple rotor blades 8, blade connector loops 10 can then, for example, be placed above one another or layered in axial direction A of rotor mast 4. The axial offset of rotor blades 8 thereby created is negligible in this context because of the thinness of blade connector loops 10.

In the context of the rotor design according to the present invention, the ring-like centrifugal-force sleeve 16, which is free to move with respect to rotor mast 4, discharges the very large centrifugal forces occurring in the rotating rotor blades 8 during continuous rotor operation, and prevents those forces from stressing rotor mast 4 directly. Because multiple rotor blades 8 are connected via their blade connector loops 10 to centrifugal-force sleeve 16, and rotor blades 8 are located opposite one another in paired fashion, centrifugal-force sleeve 16 creates, as it were, a continuous, uninterrupted centrifugal-force segment to the respective oppositely located rotor blade, in which the force path flows around rotor mast 4. This has the advantage that the considerable centrifugal forces of a respective rotor blade 8 are transferred and compensated for directly by the opposite rotor blade 8. It should be noted at this juncture that this principle functions even if the rotor has a number of rotor blades, e.g. an odd number of rotor blades, such that the respective rotor blades 8 are not located with a 180-degree offset from one another, since the respective centrifugal-force components are correspondingly distributed.

The large diameter of centrifugal-force sleeve 16, in combination with a correspondingly adapted large loop radius for blade connector loops 10, ensures favorable force introduction and load distribution. These components can therefore be constructed with a thin wall thickness, which is in turn beneficial in terms of flapwise softness and low weight.

In the hingeless rotor according to the present invention, joining tabs 12 have the task of absorbing the lead-lag moments occurring during continuous rotor operation, and transferring drive torque to the rotor. Because, as mentioned, the centrifugal forces proceeding from rotor blades 8 are discharged by centrifugal-force sleeve 16, joining tabs 12 are not impinged upon by those centrifugal forces during normal rotor operation. The stresses occurring on joining tabs 12 are therefore relatively low, and joining tabs 12 can consequently be made very thin and light, and very flexurally soft in the flapwise direction. In addition, joining tab 12, and bolt 14 with which tab 12 is mounted on rotor-head star 6, offer an advantageous redundancy in the event of failure or excessive deformation of centrifugal-force sleeve 16, since they can then, in an emergency mode, still absorb the centrifugal forces of rotor blades 8 and transfer them to rotor-head star 6.

In summary, therefore, in the rotor according to the present invention, those regions that discharge the rotor-blade centrifugal forces (i.e. blade connector loops 10 themselves) and those parts that transfer a drive torque from the rotor mast to the rotor head (i.e. joining tabs 12) are embodied, separately from one another both functionally and in terms of stress, in one combined component. The entire rotor head 2 can thus assume different tilts in the flapwise direction with respect to rotor mast 4, influenced only by the stiffness or flexural softness of joining tabs 12 and blade connector loops 10. This makes it possible, for example, without discrete components and simply by way of the elasticity or bendability of the components involved, to configure the rotor according to the present invention as a so-called gimbal rotor.

Figure 4:
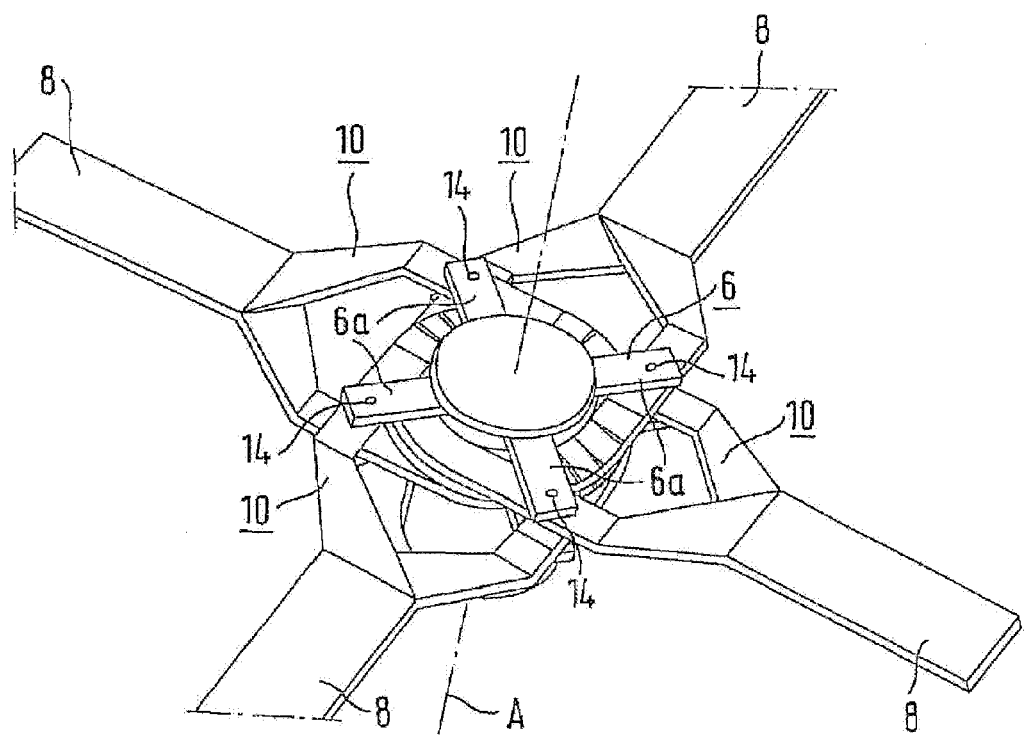
FIG. 4 is a schematic, greatly simplified perspective depiction of a rotor according to the present invention in accordance with a second embodiment.

FIG. 4 is a schematic, greatly simplified perspective depiction of a rotor according to the present invention in accordance with a second embodiment. This version largely corresponds to that of FIGS. 1 to 3. In contrast thereto, however, blade connector loops 10 do not possess a joining tab, and rotor-head star 6 is disposed at an offset of approx. 45 degrees as compared with FIG. 1. Blade connector loops 10 are joined at an overlap region of their respective loop segments, by way of a respective bolt 14 or another suitable joining means, both nonrotatably to rotor-head star 6 and to one another. Two joining points thus result for each loop 10.

The rotor according to the present invention is used in a rotorcraft, in particular in a helicopter or a tiltrotor helicopter. A rotorcraft of this kind can have one or more rotors according to the present invention, depending on the configuration.

The invention is not limited to the exemplifying embodiments above, which serve merely for general explanation of the central concept of the invention. To the contrary, within the scope of protection the rotor according to the present invention can also assume forms of embodiment different from those described concretely above. The rotor can, in particular, exhibit features that represent a combination of the features of the main claims and all or only some individual features of the associated dependent claims, as indicated by the respective internal references. The rotor according to the present invention can, in particular, be embodied for a different number of rotor blades than in the examples above. It can also have, for example, one, two, three, five, or more rotor blades. In the case of a single-blade rotor, for example, a rotor-blade counterweight, which likewise has a connector loop and is disposed at a 180-degree offset with respect to the rotor blade, can handle centrifugal-force compensation. It is furthermore possible for the blade connector loop to possess multiple loop segments or loop layers extending next to and/or above one another, which can both be joined to one another and be disposed loosely one above another. The blade connector loops can therefore be additionally distributed in multiple directions and planes.

Instead of a blade connector loop constituted by a looped loop segment, a variant can also be provided in which the loop is embodied in the form of a bearing laminate provided with an orifice, such that rotor axis A or the rotor mast extends through that orifice. A bearing laminate of this kind can be manufactured, in particular, from a plate-shaped workpiece.

A blade connector loop can furthermore have not only one, but also multiple joining tabs, which need not, or not only, be disposed in the longitudinal direction of the rotor blade on the side of the blade connector loop facing away from the rotor-blade tip, but can also be provided at different points on the blade connector loop.

Reference characters in the claims, the specification, and the drawings serve merely for better comprehension of the invention, and are not intended to limit the scope of protection.

What is claimed is:

1. A hingeless rotor, comprising:
   a rotor head;
   a rotor mast having a rotor axis;
   a torque-transmission element nonrotatably joined to the rotor mast;
   at least one rotor blade; and
   a rotor-head-side rotor-blade connector having a centrifugal-force-discharging blade connector loop that encircles the rotor mast in unattached fashion and is nonrotatably joined to the torque-transmission element.

2. The rotor as recited in claim 1, wherein the blade connector loop extends in a longitudinal direction of the at least one rotor blade.

3. The rotor as recited in claim 1, wherein the blade connector loop is self-contained.

4. The rotor as recited in claim 1, wherein the blade connector loop is of open configuration and includes at least one loop closure element configured to close the open blade connector loop.

5. The rotor as recited in claim 1, wherein the blade connector loop includes a flattened, strip-shaped loop segment.

6. The rotor as recited in claim 1, wherein the blade connector loop includes at least two loop portions that extend largely in different planes relative to one another and are combined into a loop.

7. The rotor as recited in claim 1, wherein the blade connector loop includes multiple loop segments, the multiple loop segments extending next to and/or above each other.

8. The rotor as recited in claim 1, wherein the blade connector loop is an integral component of the rotor blade.

9. The rotor as recited in claim 1, wherein the at least one rotor blade includes a plurality of rotor blades and wherein the blade connector loops of the plurality of rotor blades are disposed one above another in the axial direction of the rotor mast.

10. The rotor as recited in claim 1, wherein the at least one rotor blade includes a plurality of rotor blades and wherein the blade connector loops of the plurality of rotor blades are embodied in intersuspended fashion.

11. The rotor as recited in claim 1, wherein the at least one rotor blade includes a plurality of rotor blades and wherein the blade connector loops of the plurality of rotor blades are joined to one another at at least one point.

12. The rotor as recited in claim 1, wherein the blade connector loop includes at least one joining portion spaced radially away from the axis and at which the blade connector loop is joined to the torque-transmission element.

13. The rotor as recited in one claim 12, wherein the joining portion is configured as at least one joining tab.

14. The rotor as recited in claim 13, wherein the at least one joining tab is disposed in a longitudinal direction of the at least one rotor blade on a side of the blade connector loop facing away from a rotor-blade tip.

15. The rotor as recited in claim 1, further comprising a ring-like centrifugal-force sleeve and wherein the rotor mast extends in unattached fashion in a region of the rotor head through the centrifugal-force sleeve and the blade connector loop is disposed around the centrifugal-force sleeve.

16. The rotor as recited in claim 15, further comprising an elastic intermediate element disposed between the ring-like centrifugal-force sleeve and the rotor mast.

17. The rotor as recited in claim 1, wherein the rotor is a bearingless rotor.

18. The rotor as recited in claim 1, wherein the rotor is for a rotorcraft.

19. A rotorcraft having at least one hingeless rotor as recited in claim 1.

20. The rotorcraft as recited in claim 18, wherein the rotorcraft is at least one of a helicopter and a tiltrotor helicopter.

* * * * *